United States Patent
Vrame

(10) Patent No.: US 6,230,464 B1
(45) Date of Patent: May 15, 2001

(54) ELECTRICAL BOX HANGER

(75) Inventor: Peter A. Vrame, Elk Grove Village, IL (US)

(73) Assignee: 3244 Corporation, Chicago, IL (US)

( * ) Notice: Subject to any disclaimer, the term of this patent is extended or adjusted under 35 U.S.C. 154(b) by 0 days.

(21) Appl. No.: 09/518,051

(22) Filed: Mar. 2, 2000

(51) Int. Cl.$^7$ .............. E04B 2/00; E04B 5/00; E04B 9/00
(52) U.S. Cl. ................... 52/506.08; 52/506.07; 248/906
(58) Field of Search ............... 52/664, 506.08, 52/506.07; 248/906

(56) References Cited

U.S. PATENT DOCUMENTS

| | | | |
|---|---|---|---|
| 1,288,024 | * 2/1918 | Kendig | 248/906 |
| 4,114,327 | 9/1978 | Williams . | |
| 4,606,166 | * 8/1986 | Platt | 52/664 |
| 4,757,967 | * 7/1988 | Delmore | 248/906 |
| 4,790,505 | * 12/1988 | Rose | 248/906 |
| 4,916,877 | * 4/1990 | Platt | 52/506.07 |
| 5,405,111 | * 4/1995 | Medlin | 248/906 |
| 5,516,068 | * 5/1996 | Rice | 248/906 |
| 6,047,517 | 4/2000 | Vrame . | |

OTHER PUBLICATIONS

S–P Products, Inc., "EZ Bar Hanger System," two undated pages (admitted prior art).

* cited by examiner

Primary Examiner—Carl D. Friedman
Assistant Examiner—Kevin McDermott
(74) Attorney, Agent, or Firm—Rockey, Milnamow & Katz, Ltd.

(57) ABSTRACT

As stamped from sheet metal, an elongate hanger for hanging an electrical box between a pair of ceiling panel-supporting bars has two opposite ends, a main panel with a front surface and a back surface, a lower flange, and an upper flange. Each flange projects from the front surface and has plural grooves. Each groove is arranged to receive a tire wire wrapped around the hanger so that the tie wire is restrained in that groove against slipping along the hanger. At each of the opposite ends, the main panel has a pair of slits defining a tab adopted to be bent at a right angle. Each tab has a hole arranged to receive a fastener to fasten the tab to a ceiling panel-supporting bar extending at a right angle to the hanger.

9 Claims, 1 Drawing Sheet

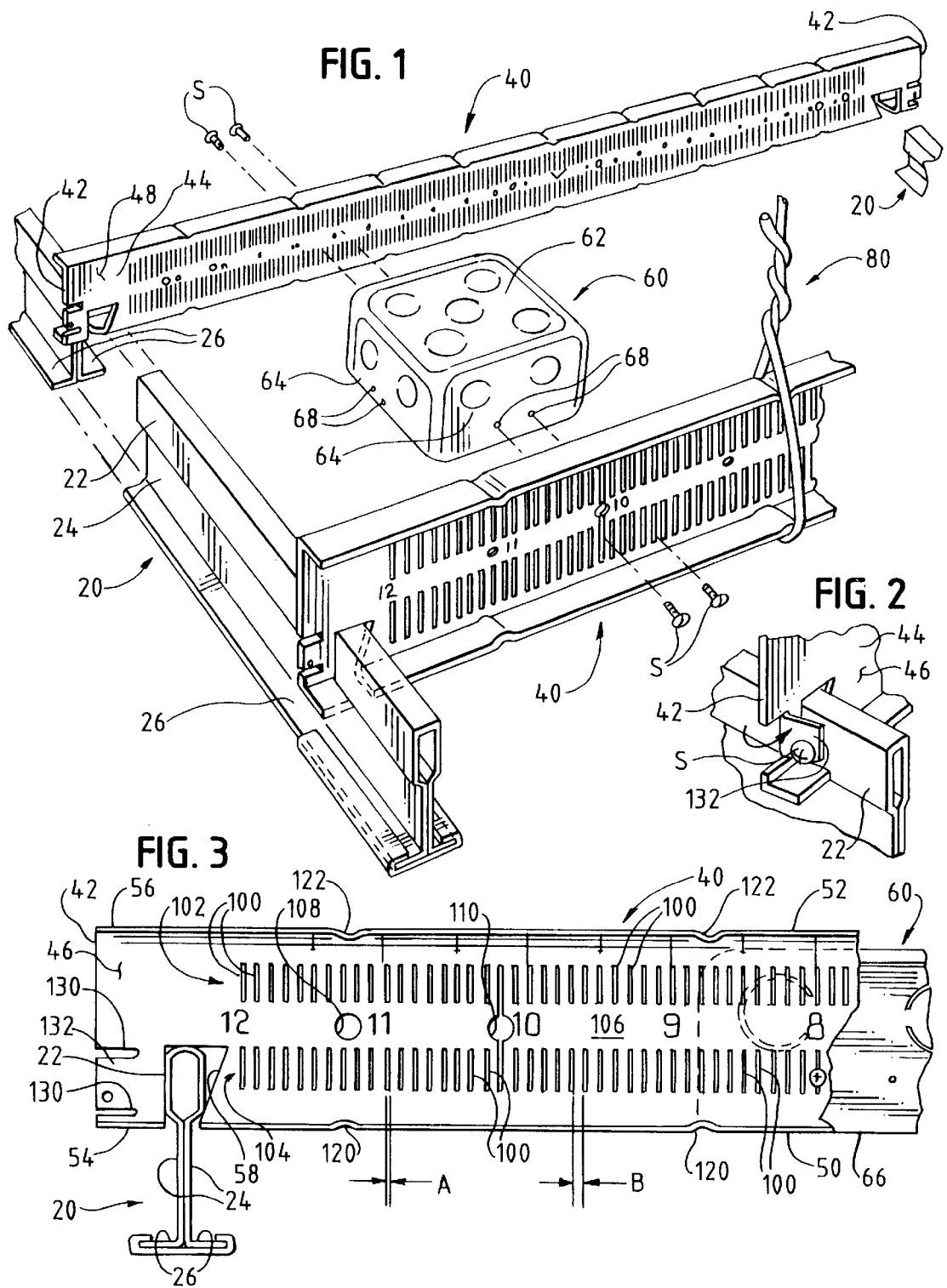

ELECTRICAL BOX HANGER

TECHNICAL FIELD OF THE INVENTION

This invention pertains to an elongate hanger that is stamped from sheet metal and that is usefull for hanging an electrical box between a pair of ceiling panel-supporting bars disposed at right angles to the hanger. As contrasted with the hanger illustrated and described in Williams U.S. Pat. No. 4,114,327, separate mounting brackets are not required.

BACKGROUND OF THE INVENTION

As disclosed in Williams U.S. Pat. No. 4,114,327, the disclosure of which is incorporated herein by reference, a pair of elongate hangers stamped from sheet metal and a pair of separate mounting brackets are used to hang an electrical box or another electrical fixture from a suspended ceiling, between a pair of eg panel-supporting bars. Similar hangers and similar mounting brackets are available commercially from S-P Products, Inc., of Elk Grove Village, Ill., under its trade designation "EZ Bar Hanger System".

Typically, as available commercially from various suppliers, an electrical box suitable for hanging from a suspended ceiling, between a pair of ceiling panel-supporting bars, opens downwardly when installed and has four side walls, each having a pair of holes pre-formed to a receive screws. Spacings between the preformed holes of the pairs vary from one supplier to another. Spacings between such holes and the lower edges of the side walls of the box vary from one supplier to another. When a pair of elongate hangers and a pair of separate mounting brackets are used to hang such a box as discussed in the preceding paragraph, the mounting brackets are fastened to an opposed pair of the side walls of the box, via screws driven through suitable holes in the mounting brackets, into the preformed holes in the opposed pair of the side walls of the box.

After the mounting brackets are fastened as discussed in the preceding paragraph, the mounting brackets are mounted on the hangers, in a manner disclosed in Williams U.S. Pat. No. 4,114,327. Usually, the mounting brackets are mounted on the elongate hangers at a selected one of multiple possible positions, which correspond to various possible spacings between such holes and the lower edges of the side walls of the box, so that the lower edges of the side walls of the box and the lower edges of the hangers are positioned approximately at a common elevation.

This invention has resulted from efforts to eliminate separate mounting brackets, which are disfavored because such brackets add material costs and installation costs, but to continuing to enable the lower edges of the side walls and the lower edges of the hangers to be approximately positioned at a common elevation.

SUMMARY OF THE INVENTION

This invention provides an elongate hanger stamped from sheet metal and useful for hanging, between a pair of ceiling panel-supporting bars disposed at right angles to the hanger, an electrical box having a side wall with a lower edge and having a pair of holes in the side wall. The hanger has two opposite ends, a main panel with a front surface and a back surface and with a lower edge and an upper edge, and a lower flange projecting from the front surface of the main panel at the lower edge of the main panel. This invention does not require separate mounting brackets as disclosed in Williams U.S. Pat. No. 4,114,327.

Rather, as contemplated by this invention, the main panel of the anger has numerous parallel slots arranged so that a pair of the slots can receive a pair of fasteners extending from the front surface, through the pair of the slots, into the pair of holes in the side wall of the electrical box, if the side wall of the electrical box is disposed against the back surface of the main panel so that the lower edge of the side wall of the electrical box is disposed at a selected elevation relative to the lower edge of the main panel of the hanger, such as a common elevation relative thereto.

Advantageously, the lower edge of the side wall of the electrical box can be thus disposed in any of numerous possible spacings between the pair of holes in the side wall of the electrical box, in any of numerous possible spacings between each of the pair of holes in the side wall of the electrical box and a nearer one of the opposite ends of the hanger, and in any of a range of possible spacings between each of the pair of holes in the side wall of the electrical box and the lower edge of the side wall of the electrical box Preferably, the slots are arranged in an upper row and a lower row, the upper and lower rows being spaced from each other, the upper row being spaced from the upper edge of the main panel and the lower edge being spaced from the lower edge of the main panel. Preferably, moreover, the main panel of the hanger has a substantially imperforate portion separating the upper and lower rows of the slots.

Preferably, as an added feature, the lower flange has plural grooves, each of which is arranged to receive a tie wire wrapped around the hanger so that the tie wire is restrained in said groove against slipping along the hanger. Preferably, moreover, the hanger has an upper flange projecting from the front surface of the main panel, at the upper edge of the main panel and the upper flange having plural grooves, each of which is disposed above one of the grooves of the lower flange.

Preferably, as an added feature, the main panel has, at each of the opposite ends, a pair of slits defining a tab adapted to be bent at a right angle. The tab has a hole arranged to receive a fastener to fasten the tab to a ceiling panel-supporting bar extending at a right angle to the hanger.

These and other objects, features, and advantages of this invention are evident from the following description of a preferred embodiment of this invention, with reference to the accompanying drawings.

BRIEF DESCRIPTION OF THE DRAWINGS

FIG. 1 is a fragmentary, perspective view of a partly exploded assembly comprising a pair of ceiling panel-supporting bars, a pair of elongate hangers, an electrical box, and a tie wire, each hanger constituting a preferred embodiment of this invention.

FIG. 2 is a fragmentary, perspective detail taken from a different vantage and showing a screw used to fasten a tab on one of the hangers, to one of the bars.

FIG. 3, is an enlarged, fragmentary elevation of one of the bars, one of the hangers, and the electrical box, as assembled except for the tab being fastened to the bar.

DETAILED DESCRIPTION OF THE PREFERRED EMBODIMENT

In FIG. 1, an assembly is shown, which comprises a pair of ceiling panel-supporting bars 20, a pair of elongate hangers 40, an electrical box 60, and a tie wire 80. The bars 20, the electrical box 40, and the tie wire 80 are conventional. The hangers 40 have improvements enabling the electrical box 60 to be effectively mounted to the hangers 40, which hang the electrical box 60 between the bars 20, without separate mounting brackets.

The ceiling panel-supporting bars 20, which may be also known as inverted T-bars, have upper rails 22, vertical webs 24 below the rails 22, and oppositely extending flanges 26 below the webs 24. The rails 22 are widened, as compared to the webs. The bars 20 are suspended via tie wires (not shown) or otherwise from a true ceiling (not shown) in a known manner. Ceiling panels (not shown) are supported on the flanges 26.

Each hanger 40 is stamped from sheet steel so as to have two opposite ends 42, a main panel 44 with a front surface 46 and a back surface 48 and with a lower edge 50 and an upper edge 52, a lower flange 54, and an upper flange 56. The lower flange 54 projects from the front surface 46 of the main panel 44, at the lower edge 50 of the main panel 44, and the upper flange 56 projects from the front surface 46 of the main panel 44, at the upper edge 52 of the main panel 44. Near each of its opposite ends 42, each hanger has a wide slot 58, which extends through the lower flange 54, into the main panel 44, and which accommodates the rail 22 and the vertical webs 24 of an associated bar 20.

The electrical box 60 is stamped from sheet steel so as to open downwardly when installed, so as to have an upper wall 62, and so as to have four side walls 64, each having a lower edge 66 and each having a pair of holes 68 pre-formed holes to receive self-tapping screws S of a small type used commonly to install such electrical boxes, electrical brackets, etc. Spacings between the pre-formed holes 68 of the pairs vary from one supplier to another. Spacings between such holes 68 and the lower edges 66 of the side walls 64 vary from one supplier to another.

As contemplated by this invention, the main panel 44 of each hanger 40 has numerous parallel slots 100 in an upper row 102, which is spaced from the upper edge 52 of the same panel 44, and in a lower row 104, which is spaced from the upper row 102 and from the lower edge 50 of the same panel 40. The same panel 44 has a substantially imperforate portion 106 separating the upper and lower rows 102, 104, of the slots 100 and contributing to the structural integrity of such hanger 40. Each slot 100 has a comparatively narrow width A, which is sufficiently wide (e.g. 1/16 inch) for such slot 100 to pass the shank but not the head of one of the screws S, and each slot 100 is spaced from the next slot 100 by a comparatively wider spacing B.

In each hanger 40, a pair of the slots 100 can receive a pair of the screws 100 extending from the front surface 46 of the main panel 44 of such hanger 40, through the pair of the slots 100, into the pair of holes 68 in a chosen one of an opposed pair of the side walls 64 of the electrical box 60, if the chosen one of the side walls of the electrical box 60 is disposed against the back surface 48 of the same panel 44 so that the lower edge 66 of the chosen wall 64 of the electrical box 60 is disposed at a selected elevation relative to the lower edge 54 of the same panel 44, usually a common elevation relative thereto, as shown Advantageously, the lower edge 66 of the chosen wall 64 can be thus disposed in any of numerous possible spacings between the pair of holes 68 in the chosen wall 64, in any of numerous possible spacings between each of the pair of holes 68 in the chosen wall 64 and a nearer one of the opposite ends 42 of such hanger 40, and in any of a range of possible spacings between each of the pair of holes 68 in the chosen wall 64 and the lower edge of the chosen wall 64.

The substantially imperforate portion 106 has some holes 108 (one shown) of a diameter substantially greater than the width A, each being spaced from the slots 100 of the upper and lower rows 102, 104, and some holes 110 (one shown) of a similar diameter, each communicating with one of the slots 100 of the upper row 102 and with one of the slots 100 of the lower row 104. The holes 108, 110, are useful to accommodate tie wires (not shown) like the tie wire 80 or to accommodate larger screws or other fasteners (not shown) to mount light fixtures, speaker boxes, fire alarm boxes, or other large fixtures (not shown) to such hanger 40.

As an added feature, the lower flange 54 of each hanger 40 has plural grooves 120 and the upper flange 56 of such hanger 40 has plural grooves 122, each of which is paired with and is disposed above one of the grooves 120 of the lower flange 54 of such hanger 40. Each such pair of such grooves 120, 122, is arranged to receive a tie wire 80 wrapped around such hanger 40 so that the tie wire 80 is restrained in such groove 120 against slipping along such hanger 40.

As an added feature, the main panel 44 of each hanger 40 has, at each of its opposite ends 42, a pair of slits 130 defining a tab 132, which is adapted to be bent at a right angle. The tab 132 has a hole arranged to pass the shank but not the head of a self-tapping screw S to fasten the tab 132 to the upper rail 22 of the nearer bar 20. The upper rail 22 thereof may have a pre-formed hole (not shown) to receive the screw S.

As shown in FIG. 2, it is useful for each hanger to have impressed markings in inches, as shown, in centimeters, or in other dimensions to assist installers to place the electrical box 60 at a desired location.

It may be possible to modify the preferred embodiment, as shown in the drawings and described above, without departing from the scope and spirit of this invention.

What is claimed is:

1. An elongate hanger stamped from sheet metal and useful for hanging an electrical box between a pair of ceiling panel-supporting bars, wherein the hanger has two opposite ends, a main panel with a front surface and a back surface and with a lower edge and an upper edge, and a lower flange projecting from the front surface of the main panel, at the lower edge of the main panel, and wherein the lower flange has plural grooves, each of which is arranged to receive a tie wire wrapped around the hanger so that the tie wire is restrained in said groove against slipping along the hanger.

2. The hanger of claim 1, wherein the hanger has an upper flange projecting from the front surface of the main panel, at the upper edge of the main panel, the upper flange having plural grooves, each of which is disposed above one of the grooves of the lower flange.

3. The hanger of claim 1 or 2 wherein, at each of the opposite ends, the main panel has a pair of slits defining a tab adopted to be bent at a right angle, the tab having a hole arranged to receive a fastener to fasten the tab to a ceiling panel-supporting bar extending at a right angle to the hanger.

4. An elongate hanger stamped from sheet metal and useful for hanging an electrical box between a pair of ceiling panel-supporting bars, wherein the hanger has two opposite ends, a main panel with a front surface and a back surface and with a lower edge and an upper edge, and a flange projecting from the front surface of the main panel, and wherein the flange has plural grooves, each of which is arranged to receive a tire wire wrapped around the hanger so that the tie wire is restrained in said groove against slipping along the hanger.

5. The hanger of claim 4 wherein the flange is an upper flange, projecting from the front surface of the main panel, at the upper edge of the main panel.

6. An elongate hanger stamped from sheet metal and useful for hanging an electrical box between a pair of ceiling panel-supporting bars, wherein the hanger has two opposite ends and wherein, at at least one of the opposite ends, the main panel is slitted so as to define a tab adapted to be bent, the tab having a hole arranged to receive a fastener to fasten the tab to a ceiling panel-supporting bar.

7. The hanger of claim 6 wherein the bracket has a pair of slits defining the tab.

8. An elongate hanger stamped from sheet metal and useful for hanging an electrical box between a pair of ceiling panel-supporting bars, wherein the hanger has two opposite ends and wherein the hanger has two opposite ends and wherein, at each of the opposite ends, the main panel is slitted so as to define a tab adapted to be bent, the tab having a hole arranged to receive a fastener to fasten the tab to a ceiling panel-supporting bar.

9. The hanger of claim 8 wherein the bracket has a pair of slits defining the tab.

\* \* \* \* \*

UNITED STATES PATENT AND TRADEMARK OFFICE
CERTIFICATE OF CORRECTION

PATENT NO. : 6,230,464 B1  Page 1 of 1
DATED : May 15, 2001
INVENTOR(S) : Peter A. Vrame It is certified that error appears in the above-identified patent and that said Letters Patent is hereby corrected as shown below:

Column 1,
Line 5, "usefull" should read -- useful --.
Line 10, "4,1 14,327" should read -- 4,114,327 --.
Line 19, "eg" should be replaced by -- ceiling --.
Line 27, second occurrence of "a" should be deleted.

Column 4,
Line 31, "modily" should read -- modify --.
Line 52, "adopted" should read -- adapted --.
Line 62, "tire" should read -- tie --.

Signed and Sealed this

Twenty-ninth Day of January, 2002

Attest:

Attesting Officer

JAMES E. ROGAN
Director of the United States Patent and Trademark Office